United States Patent
Sullivan et al.

(10) Patent No.: US 10,954,723 B2
(45) Date of Patent: Mar. 23, 2021

(54) QUICK CONNECT DEVICE AND SUB

(71) Applicant: GEODYNAMICS, INC., Millsap, TX (US)

(72) Inventors: Shelby Sullivan, Minot, ND (US); Phil Phelps, Fort Worth, TX (US); Jim Rollins, Lipan, TX (US); Terrell Saltarelli, Weatherford, TX (US)

(73) Assignee: GEODYNAMICS, INC., Millsap, TX (US)

( * ) Notice: Subject to any disclaimer, the term of this patent is extended or adjusted under 35 U.S.C. 154(b) by 0 days.

(21) Appl. No.: 16/495,026

(22) PCT Filed: Apr. 12, 2019

(86) PCT No.: PCT/US2019/027159
§ 371 (c)(1),
(2) Date: Sep. 17, 2019

(87) PCT Pub. No.: WO2019/204137
PCT Pub. Date: Oct. 24, 2019

(65) Prior Publication Data
US 2020/0386060 A1    Dec. 10, 2020

Related U.S. Application Data

(60) Provisional application No. 62/660,628, filed on Apr. 20, 2018.

(51) Int. Cl.
*E21B 17/02* (2006.01)
*E21B 17/042* (2006.01)
*F16L 37/26* (2006.01)

(52) U.S. Cl.
CPC .......... *E21B 17/028* (2013.01); *E21B 17/042* (2013.01); *F16L 37/26* (2013.01)

(58) Field of Classification Search
CPC .......................... E21B 17/028; E21B 17/0285
See application file for complete search history.

(56) References Cited

U.S. PATENT DOCUMENTS

| | | |
|---|---|---|
| 5,052,849 A | 10/1991 | Zwart |
| 5,358,418 A * | 10/1994 | Carmichael ........... E21B 17/028 166/65.1 |
| 5,927,402 A | 7/1999 | Benson et al. |
| 6,148,664 A | 11/2000 | Baird |
| 2007/0018848 A1 | 1/2007 | Bottos et al. |
| 2007/0029112 A1 | 2/2007 | Li et al. |

(Continued)

OTHER PUBLICATIONS

International Search Report and Written Opinion, dated Jul. 5, 2019, from corresponding/related International Application No. PCT/US2019/027159.

*Primary Examiner* — Robert E Fuller
(74) *Attorney, Agent, or Firm* — Patent Portfolio Builders PLLC

(57) ABSTRACT

A quick connect system for connecting a first downhole tool to a second downhole tool, the quick connect system including a quick connect device configured to be mechanically attached to the first downhole tool; and a top sub configured to be mechanically attached to the quick connect device and also to the second downhole tool. The top sub has a first bulkhead element that prevents a high pressure gas from the second downhole tool to damage the quick connect device.

21 Claims, 10 Drawing Sheets

(56) References Cited

U.S. PATENT DOCUMENTS

2010/0224409 A1 9/2010 Sarhad et al.
2016/0298395 A1 10/2016 Baudoin
2016/0333675 A1 11/2016 Wells et al.

* cited by examiner

QUICK CONNECT DEVICE AND SUB

BACKGROUND

Technical Field

Embodiments of the subject matter disclosed herein generally relate to downhole tools used for perforating and/or fracturing operations in a well, and more specifically, to a downhole quick connect device and associated sub that achieve a quick connection between two downhole tools.

Discussion Of The Background

In the oil and gas field, once a well 100 is drilled to a desired depth H relative to the surface 110, as illustrated in FIG. 1, and the casing 102 protecting the wellbore 104 has been installed and cemented in place, it is time to connect the wellbore 104 to the subterranean formation 106 to extract the oil and/or gas. This process of connecting the wellbore to the subterranean formation may include a step of isolating a stage of the casing 102 with a plug 112, a step of perforating the casing 102 with a perforating gun assembly 114 such that various channels 116 are formed to connect the subterranean formations to the inside of the casing 102, a step of removing the perforating gun assembly, and a step of fracturing the various channels 116.

Some of these steps require to lower in the well 100 a wireline 118 or equivalent tool, which is electrically and mechanically connected to the perforating gun assembly 114 through a connecting tool 115, and to activate the gun assembly and/or a setting tool 120 attached to the perforating gun assembly. Setting tool 120 is configured to hold the plug 112 prior to isolating a stage and also to set the plug. FIG. 1 shows the setting tool 120 disconnected from the plug 112, indicating that the plug has been set inside the casing.

FIG. 1 shows the wireline 118, which includes at least one electrical connector, being connected at one end to the connecting tool 115, and the other end being connected to a control interface 122, located on the ground 110, above the well 100. An operator of the control interface may send electrical signals to the perforating gun assembly and/or setting tool for (1) setting the plug 112 and (2) disconnecting the setting tool from the plug. A fluid 124, (e.g., water, water and sand, fracturing fluid, etc.) may be pumped by a pumping system 126, down the well, for moving the perforating gun assembly and the setting tool to a desired location, e.g., where the plug 112 needs to be deployed, and also for fracturing purposes.

The above operations may be repeated multiple times for perforating and/or fracturing the casing at multiple locations, corresponding to different stages of the well. Note that in this case, multiple plugs 112 and 112' may be used for isolating the respective stages from each other during the perforating phase and/or fracturing phase.

These completion operations may require the wireline 118 to be repetitively connected and disconnected from the gun assembly 114. This involves the connecting tool 115 being unscrewed from the gun assembly 114 and then screwed back. Note that the connecting tool 115 ensures that electrical signals from the surface are passed to the gun assembly 115. However, the electrical contacts of the connecting tool are currently exposed to a high pressure generated in the gun assembly when various shaped charges are fired and/or to a high pressure from the wellbore. Thus, after a few connecting and disconnecting operations, the current connecting tool 115's electrical contact is damaged by the high pressure generated by the shaped charges. Consequently, the current connecting tool needs to be taken apart and rebuilt, which is time consuming. In addition, the current connecting tools are long as they are designed to fit a variety of gun assemblies or setting tools.

Thus, there is a need to provide a shorter connecting tool that is protected from the blast generated by the shaped charges or other charges that are fired in the well so that the connecting tool can be used for a longer period of time.

SUMMARY

According to an embodiment, there is a quick connect system for connecting a first downhole tool to a second downhole tool, the quick connect system including a quick connect device configured to be mechanically attached to the first downhole tool, and a top sub configured to be mechanically attached to the quick connect device and also to the second downhole tool. The top sub has a first bulkhead element that prevents a high pressure gas from the second downhole tool to damage the quick connect device.

According to another embodiment, there is a quick connect device for connecting a first downhole tool to a second downhole tool in a well. The quick connect device includes a mandrel extending along a longitudinal axis x; a collar attached to a downstream end of the mandrel; an electrical connections assembly extending from one end to the other end of the mandrel, and an electrical insulators assembly surrounding the electrical connections assembly to prevent an electrical contact between the electrical connections assembly and a body of the mandrel. Both ends of the electrical connections assembly have spring-loaded electrical contacts.

According to yet another embodiment, there is a method for connecting a first downhole tool to a second downhole tool in a well, and the method includes lowering the first downhole tool into the well; connecting a top sub to the first downhole tool; attaching a quick change device to the top sub; and attaching the quick change device to the second downhole tool. The quick change device has a spring-loaded electrical contact at each end and the top sub includes at least one bulkhead element that prevents a high pressure gas from the first downhole tool to reach the quick change device.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a quick connect device that attaches a sub to a wireline. However, the embodiments discussed herein are applicable to other downhole tools, e.g., a setting tool or a gun assembly.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a quick connect device has a mandrel and a collar that can be rotated relative to the mandrel to attach to a downhole tool (e.g., gun, setting tool, collar locator device, etc.). The quick connect device has spring-loaded electrical contacts at each end. A sub attached to the gun assembly, to which the quick connect device attaches by rotation, is configured to have at least one pass-thru bulkhead device that is configured to prevent the high-pressure gas, which results from the detonation of a charge, downstream from the sub, from reaching the quick connect device. Thus, the pass-thru bulkhead takes the blast from the detonation and extends the life of the quick connect device. These features are now discussed in more detail with regard to the figures.

Figure 1:
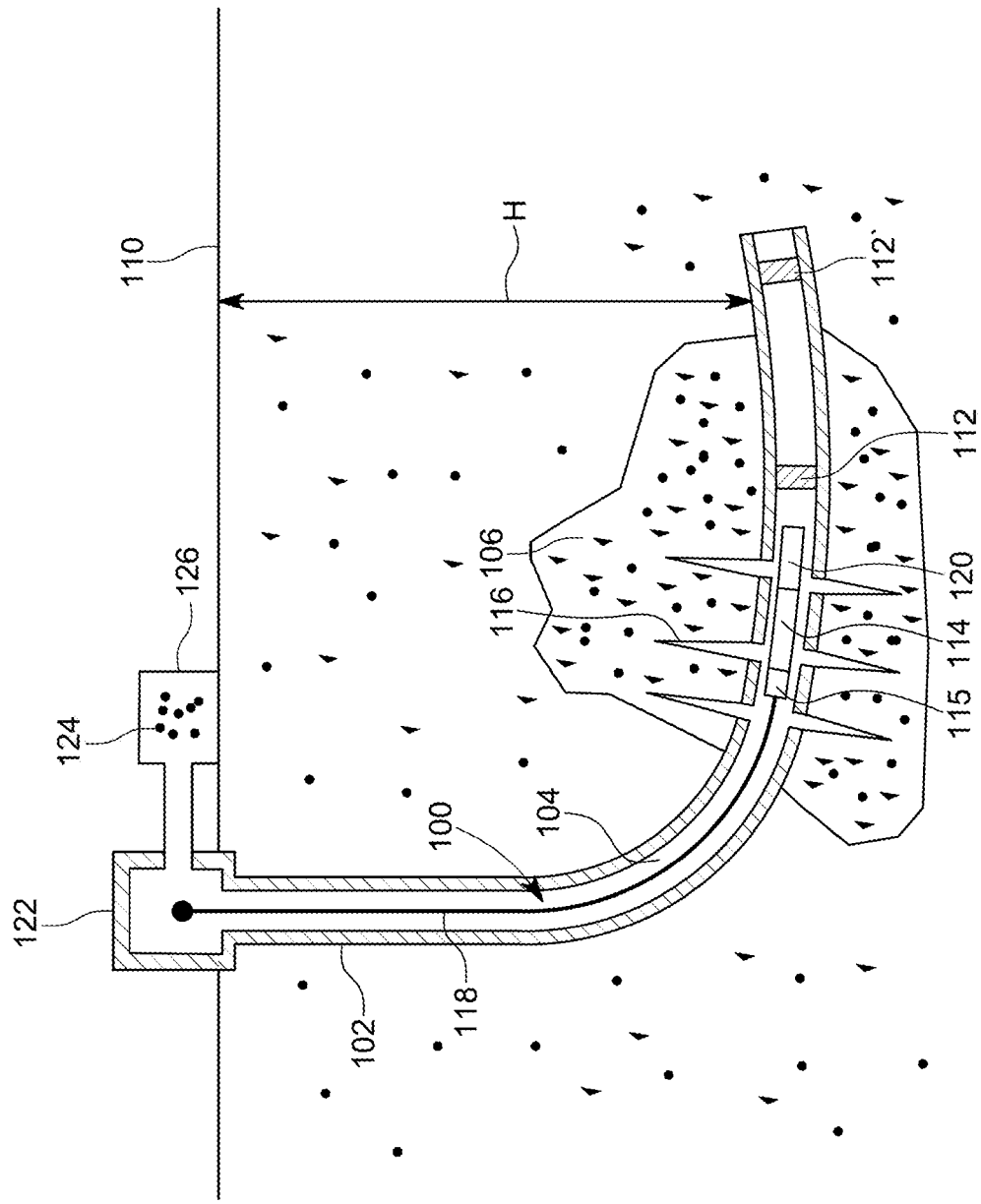
FIG. 1 illustrates a well and associated equipment for well completion operations.
Figure 2:
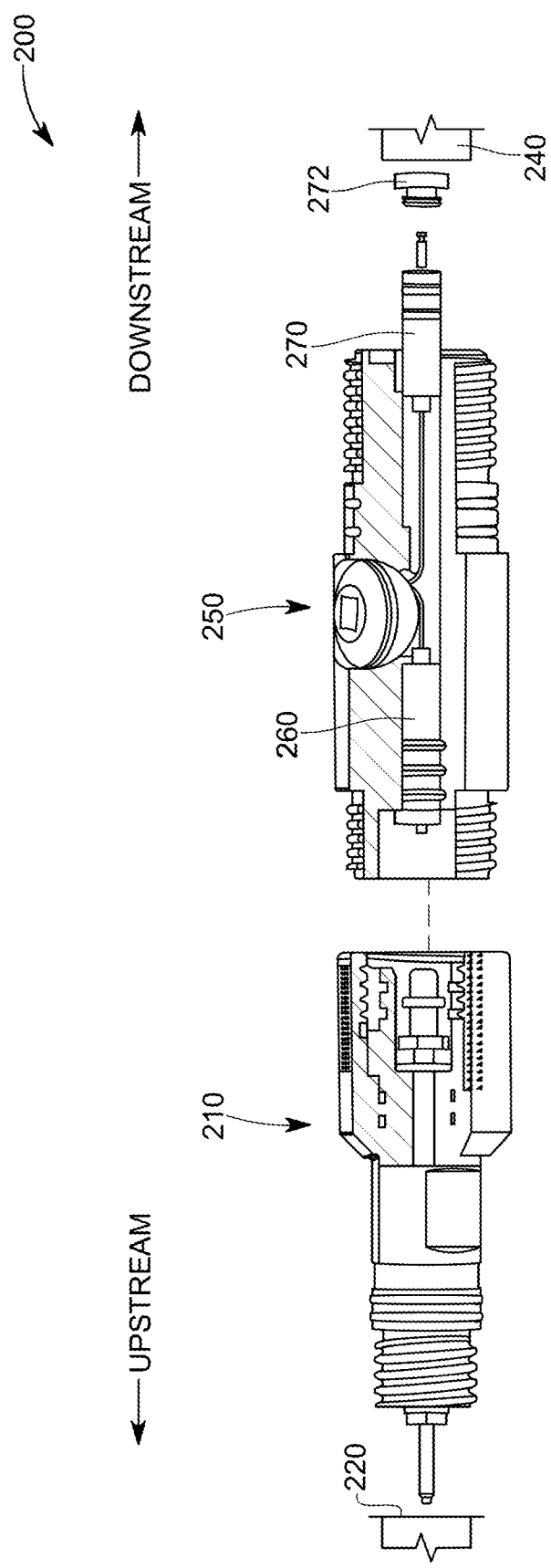
FIG. 2 illustrates a quick connect system that attaches a first downhole tool to a second downhole tool.

FIG. 2 shows a quick connect system 200 that includes the quick connect device 210 and a top sub 250. The quick connect device 210 may be connected upstream to a wireline 220 while the top sub 250 may be connected downstream to a gun assembly 240. As previously discussed, a setting tool may be configured similar to the top sub 250 to directly connect to the quick connect device 210. In one application, the quick connect device 210 connects to a collar locator device instead of the wireline 220. Other downhole tools may be configured to connect to the quick connect device 210 and the top sub 250 to achieve a quick connection. FIG. 2 also shows two bulkhead elements 260 and 270 that are located inside the top sub 250. FIG. 2 further shows a retainer nut 272 that fixedly attaches the bulkhead element 270 to a bore of the top sub 250.

Figure 3A:
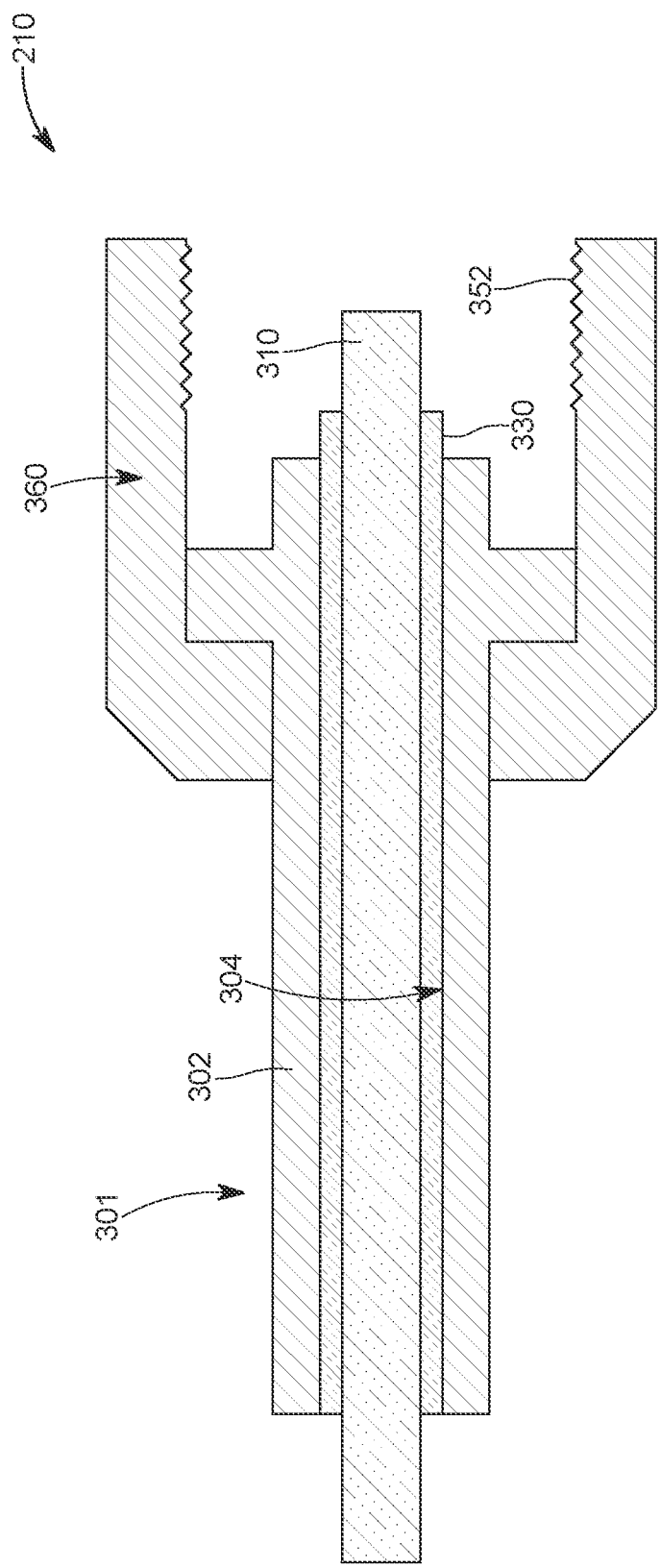
FIGS. 3A and 3B illustrate a quick connect device that is part of the quick connect system.
Figure 3B:
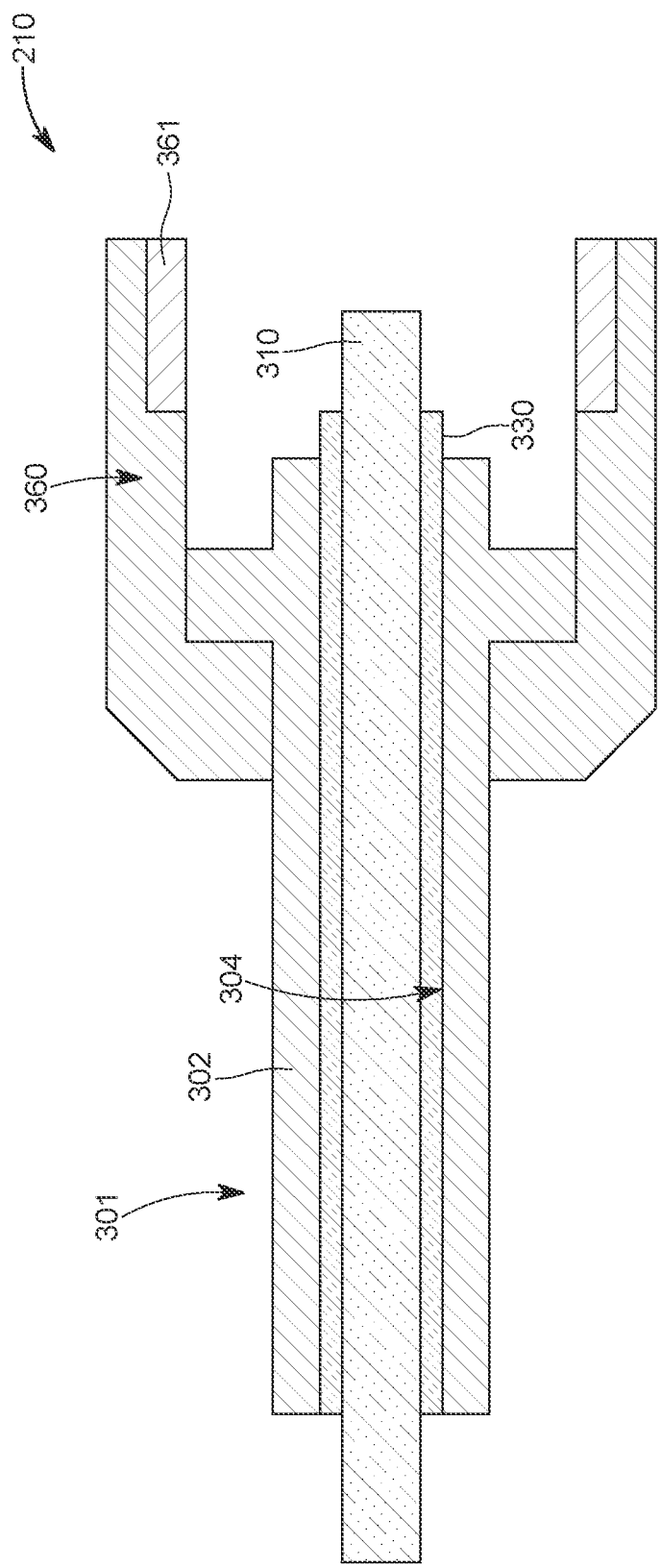

FIG. 3A shows a cross-section of the quick connect device 210. In this figure, it is visible a mandrel 301 having a body 302. The body 302 has a bore 304 in which an electrical connections assembly 310 and an electrical insulators assembly 330 are located. The electrical connections assembly 310 (which is shown as a single piece in the figure, but it can include plural components as discussed later) includes various components that ensure that an electrical signal propagates along a longitudinal electrical path from one end to the other end of the quick connect device 210. Thus, the electrical connections assembly 310 ensures that the quick connect device 210 acts as a pass-thru electrical device. The electrical insulators assembly 330, as discussed later, ensures that each part of the electrical connections assembly 310 is electrically insulated from the body 302 of the quick connect device 210 so that no electrical signal that propagates along the electrical connections assembly 310 enters or strays into the body 302. In this way, a ground connection between the surface and a tool in the well can be provided through the body 302 of the quick connect device 210. FIG. 3A also shows a collar or sleeve 360 attached to the body 302. Collar 360 is configured with internal threads 352 for connecting by rotation to the top sub 250 or other tools. In one embodiment, the collar 360 is fixedly attached to the body 302. In the embodiment of FIG. 3A, the collar 360 can freely rotate around the body 302 so that, when the collar is attached to a gun or another tool, there is no need to rotate the entire assembly. It is also possible to configure the collar 360 to have quick connection mechanism 361 that can be securely attached to a next tool. The quick connection mechanism 361 can be any mechanism that is able to rotate relative to the body 302, so that there is no need to rotate the tools to which the quick connect device 210 is attached. For example, in one application, the quick connection mechanism 361 can be a ratcheting collar connection. In another application, the quick connection mechanism 361 can be a J-locking device.

Figure 4:
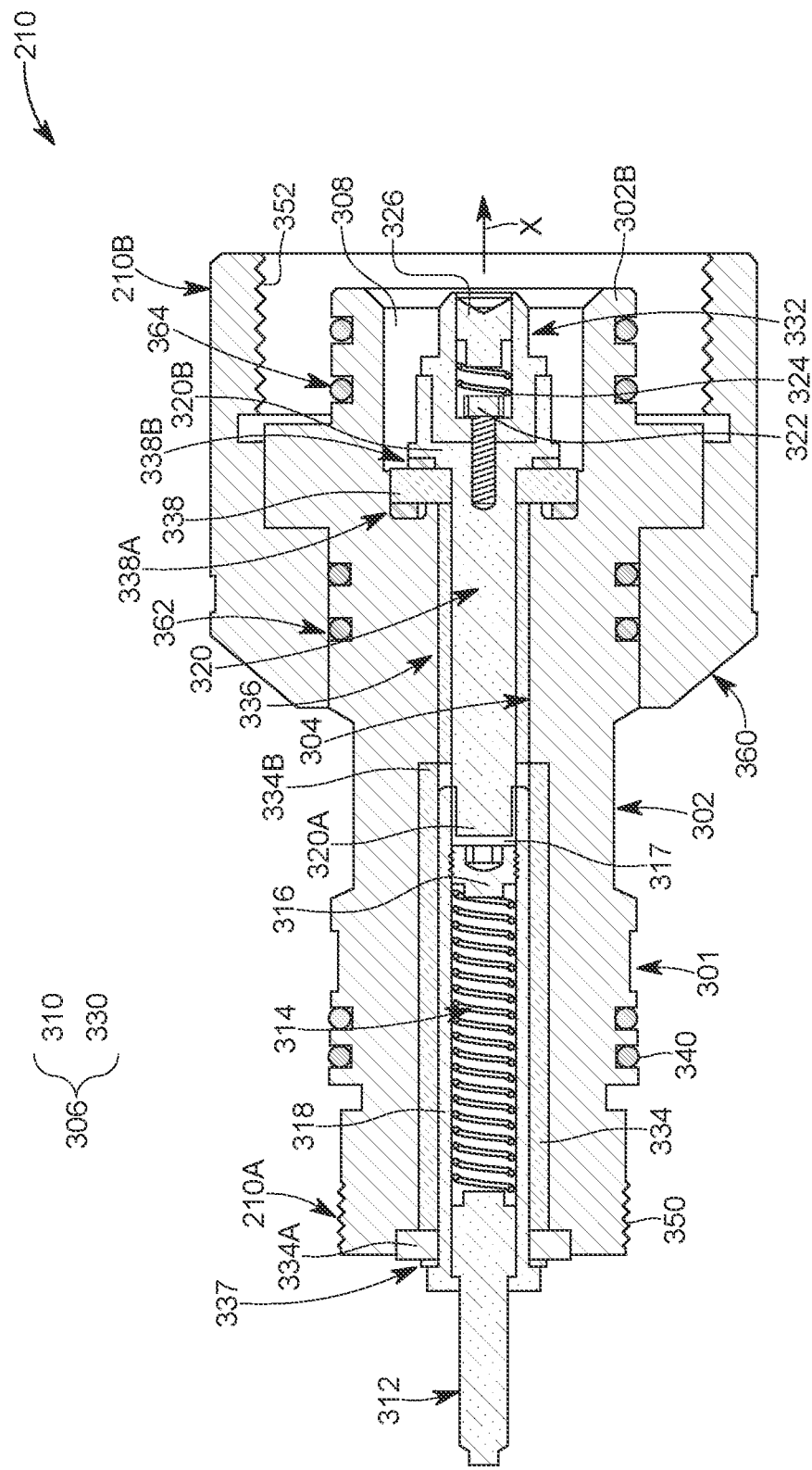
FIG. 4 illustrates various internal components of the quick connect device.

In one application, as shown in FIG. 4, the electrical connections assembly 310 is implemented to include, starting from the upstream end 210A of the quick connect device 210 to the downstream end 210B, a plunger 312 that partially extends outside the body 302, along a longitudinal axis X. Further, the electrical connections assembly 310 includes compression means 314 (for example, a spring), and a fixed element 316 (for example, a screw) which is fixedly attached to a barrel 318. The barrel 318 is inserted into the bore 304 of the body 302 and is electrically conductive. The plunger 312 and compression means 314 are configured to slide inside the barrel 318. In one application, the plunger 312 may be attached to the compression means 314, for example, by welding or similar processes.

Figure 5:
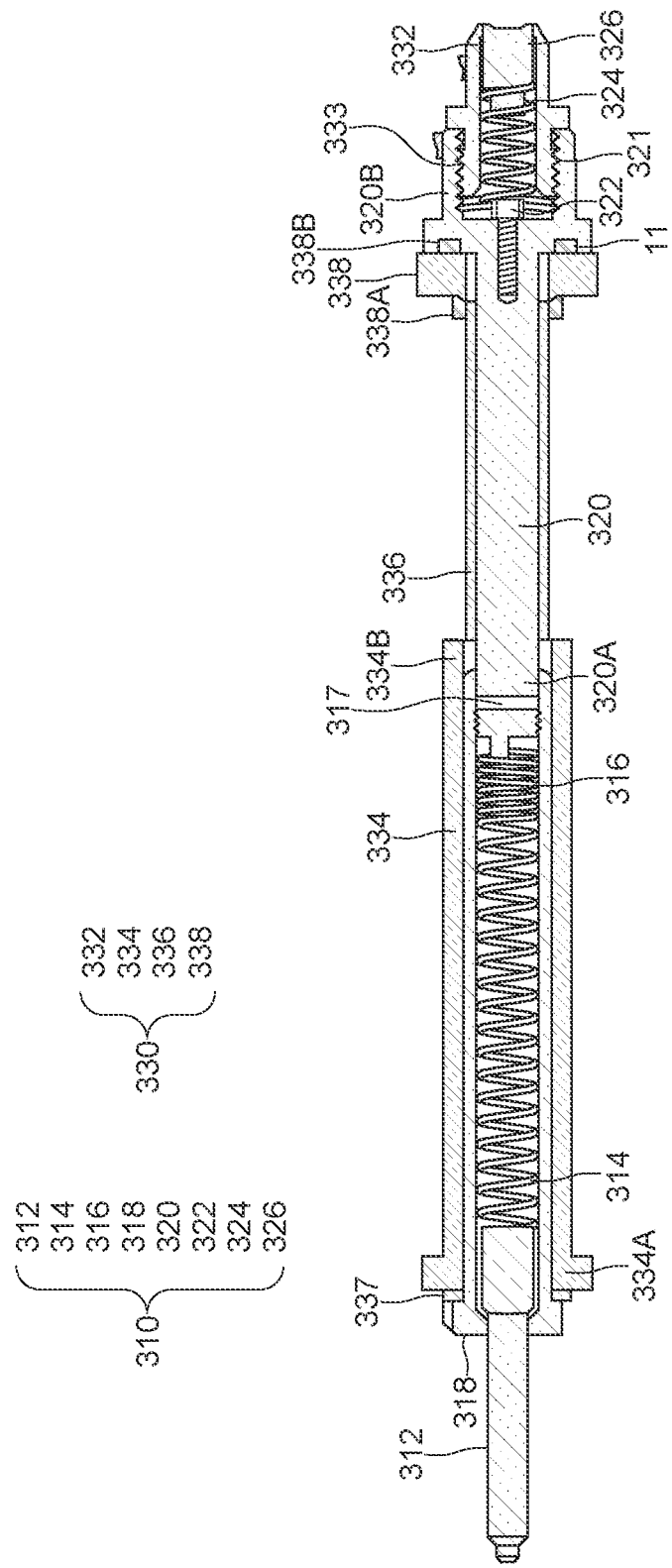
FIG. 5 illustrates various electrical and insulating components of the quick connect device.

The various elements of the electrical connections assembly 310 and the electrical insulators assembly 330 are also shown in FIG. 5, with no other elements of the quick connect device 210. Continuing along the downstream direction of the electrical connections assembly 310, next it is a contact rod 320 that has its upstream end 320A entering inside the barrel 318. In one application, there is a small chamber 317 formed between the upstream end 320A of the contact rod 320 and the fixed element 316. The other end (downstream end) 320B of the contact rod 320 extends into a chamber 308 formed by the downstream end 302B of the body 302. The chamber 308 fluidly communicates with the bore 304. However, the bore 304 is fully occupied by the electrical connections assembly 310 and the electrical insulators assembly 330 while the chamber 308 is partially occupied by the electrical connections assembly 310 and the electrical insulators assembly 330.

A conductive screw 322 is attached to the downstream end 320B of the contact rod 320, as shown in FIGS. 4 and 5. The conductive screw 322 is in electrical contact with a second compression means 324 (e.g., a spring), which in turn is in electrical contact with a contact 326. The compression means 324 and the contact 326 form a spring-loaded contact, and they are configured to slide inside an insulating retainer 332, which is shaped as a cylinder in this embodiment. The insulating retainer 332 is part of the electrical insulators assembly 330. In this embodiment, the insulating retainer 332 has exterior threads 333 that are configured to engage corresponding threads 321 formed into the inside part of the downstream end 320B of the contact rod 320.

With regard to the electrical insulators assembly 330, it may be implemented as now discussed with regard to FIGS. 4 and 5. A first tubular insulator 334 may be located inside the bore 304 of the body 302, so that the barrel 318 is completely surrounded by the first tubular insulator 334, and electrically insulated from the body 302. An optional washer 337 may be provided at the upstream end, to prevent electrical contact with the upstream tool (e.g., wireline). The upstream end 334A of the first tubular insulator 334 may be shaped as a washer. The downstream end 334B of the first tubular insulator 334 contacts a second tubular insulator 336, which fully encloses the contact rod 320 and electrically insulates the contact rod from the body 302 of the mandrel 301. An insulating washer 338 is placed at the downstream end of the second tubular insulator 336, so that the contact rod 320 is electrically insulated from the downstream end 302B of the body 302. In one embodiment, as illustrated in FIG. 4, the insulating washer 338 is sandwiched between the body 302 and the downstream end 320B of the contact rod 320. In one application, a part of the insulating washer 338 is directly exposed to the chamber 308. Optionally, o-rings 338A and 338B may be placed on each side of the insulating washer 338. Additional o-rings 340 may be placed on the outside of the body 302, to prevent a fluid to pass along the quick connect device 210.

Attached to the mandrel 301, there is the collar 360. O-rings 362 are placed between the body 302 of the mandrel 301 and the collar 360 so that a fluid is prevented from passing along this interface. Additional o-rings 364 may be placed on the outside surface of the downstream end 302B of the body 302 to prevent a fluid to pass from the gun assembly, when the quick connect device 210 is connected to the gun assembly. In one embodiment, the collar 360 is configured to rotate relative to the mandrel 301, so that the quick connect device 210 can be attached to the top sub of gun assembly or another tool without rotating the tool.

Threads 350 may be formed on the outer surface of the mandrel 301, at its upstream end 210A, while threads 352 are formed on the inner surface of the collar 360, at the downstream end 210B. These threads are configured to engage the wireline or the collar locator at the upstream end and the top sub at the downstream end.

Figure 6:
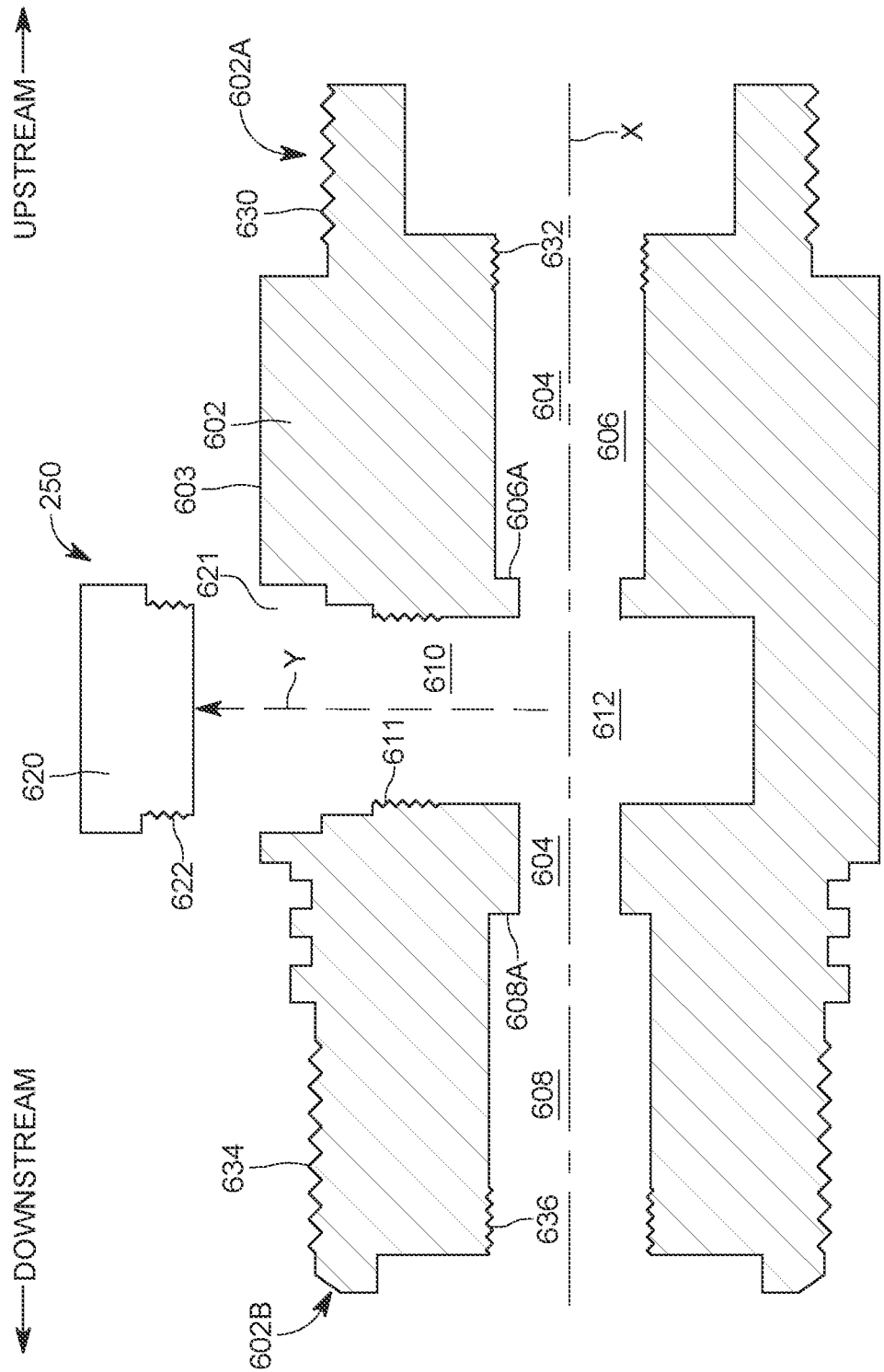
FIG. 6 illustrates a top sub that is part of the quick connect system.

The top sub 250, which attaches to the quick connect device 210, is now discussed with regard to FIG. 6. The top sub has a body 602 that extends along a longitudinal axis X. A bore 604 formed in the body 602 extends through the entire length of the body, from one end to the other end so that an upstream port is formed at the upstream end 602A of the body 602 and a downstream port is formed at the downstream end 602B of the body 602. Bore 604 is enlarged at the upstream end 602A to form a first chamber 606 for receiving a first bulkhead element. The other end of the bore 604, at the downstream end 602B, may also be enlarged to form a second chamber 608, for receiving a second bulkhead element. Thus, a diameter of the bore 604 is smaller than a diameter of the first and second chambers 606 and 608. In one application, the first and second chambers 606 and 608 are configured to be cylindrical. The respective shoulders 606A and 608A formed inside the chambers 606 and 608, respectively, prevent the first and second bulkhead elements from moving through the bore 604. Internal threads 632 and 636 are formed in each of these chambers so that after the bulkhead elements are placed inside the chambers, a corresponding nut (not shown) may be attached to the internal threads to prevent the bulkhead elements from getting out of the bore 604.

Bore 604 intersects a radial bore 610 that extends along radial axis Y. Bore 604 extends from a central chamber 612 of the body 602 to a port 621 formed at the outer surface 603 of the body 602. Chamber 612 is used for receiving electrical connections from various components (to be discussed later) that are hosted by the top sub and for allowing the operator of the top sub to electrically connect these electrical connections. A cap 620 is then attached with threads 622 to corresponding threads 611 formed in the bore 610 to close the open port of the bore.

Additional threads 630 are formed on the outside surface of the upstream end 602A of the body 602 for connecting the top sub to the quick connect device 210. Inner threads 632 are formed in the inner surface of the bore 604, at the upstream end, to connect the bulkhead element (not shown). Threads 634 are formed outside the body 602, and threads 636 are formed inside the bore 604, at the downstream end 602B, for attaching a gun assembly, and another bulkhead element (not shown), respectively.

Figure 7:
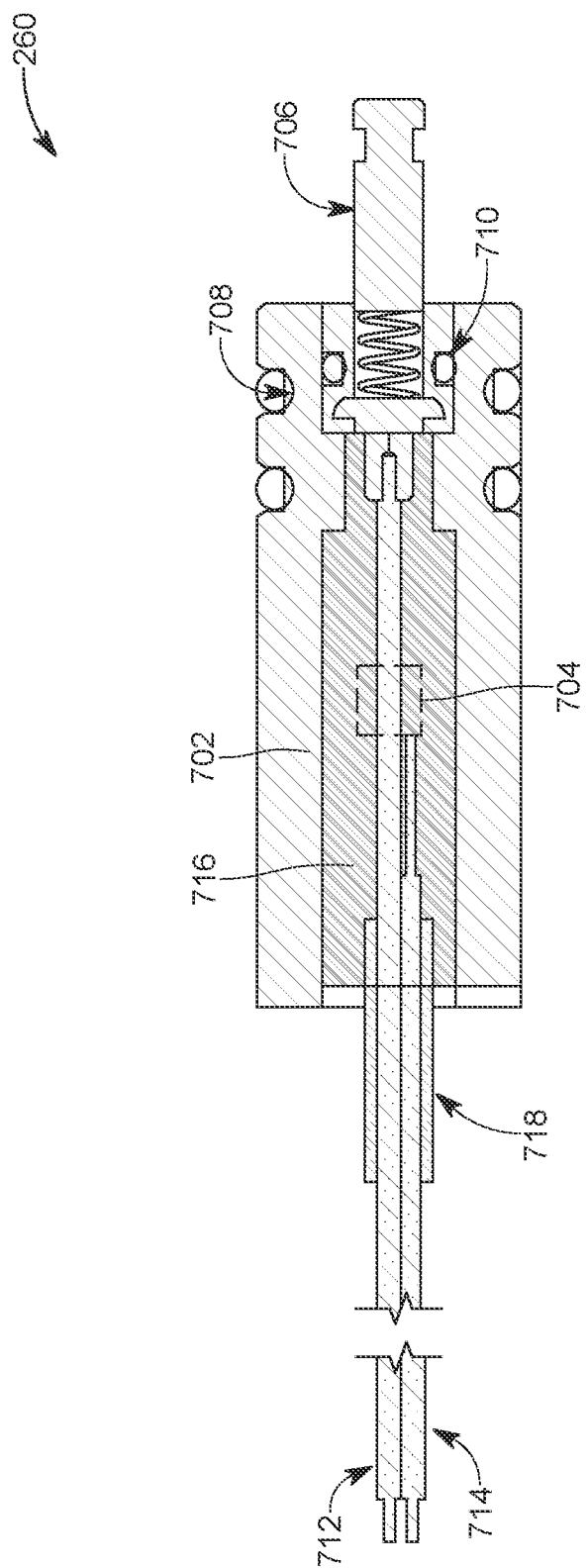
FIG. 7 illustrates a bulkhead element that is placed inside the top sub to protect the quick connect device.

A bulkhead element 260 is illustrated in FIG. 7 and it includes a housing 702 that is sized to fit inside the first or second chamber 606 and 608 of the top sub 250. Inside the housing 702, there may be a processor 704, or other electronics if the bulkhead element is an addressable switch. In one application, it is possible that the bulkhead element 260 is a simply pass-thru electrical contact. In still another application, it is possible that the bulkhead element 260 includes a detonator. An electrical connector 706 extends from inside the housing 702 to the outside and is configured to connect to another tool, as discussed later. O-rings 708 may be provided on the outside surface of the housing, to seal an interface between the bore of the top sub and the bulkhead element 260, when the bulkhead element is placed in that bore. Further o-rings 710 may be provided between the connector 708 and the housing 702. Wires 712 and 714 may be connected to the electronics 704 and they extend outside the housing 702 as shown in FIG. 7. These wires are supposed to extend to the chamber 612 of the top sub 250 when the bulkhead elements are placed in corresponding first and second chambers 606 and 608. The empty part of the interior of the housing 702 may be filed with an epoxy material 716. The part of the wires 712 and 714 that exit the housing 702 may be protected with a heat shrink element 718.

Figure 8:
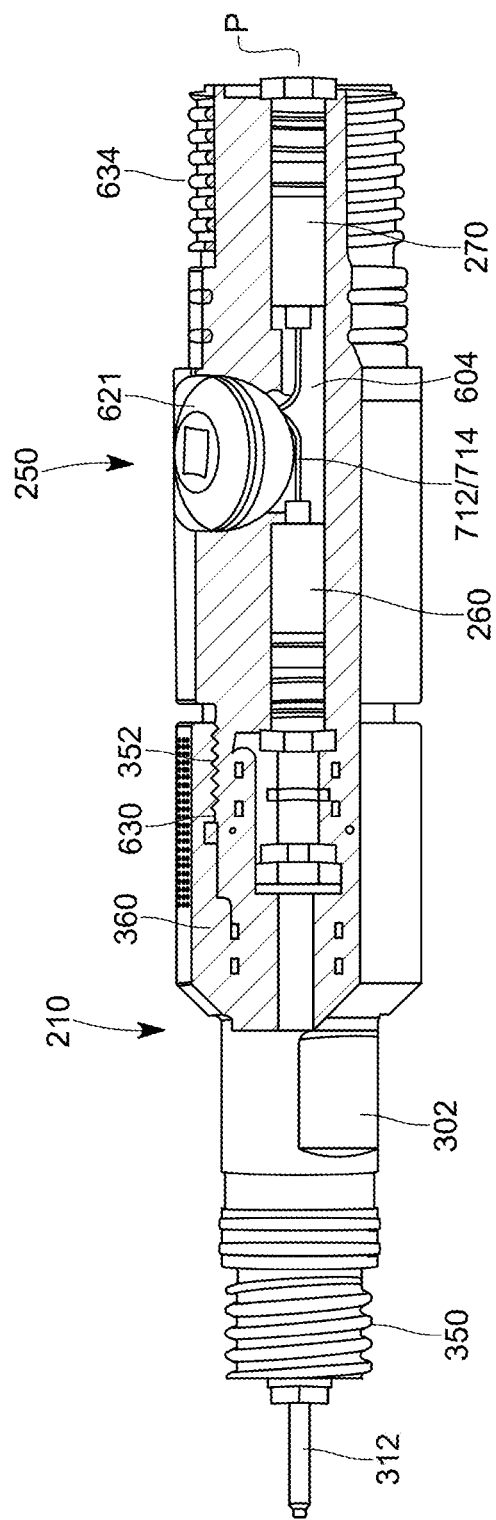
FIG. 8 shows the quick connect system assembled.

The top sub 250 having first and second bulkhead elements 260 and 270 is shown in FIG. 8. This figure also shows the quick connect device 210 attached to the top sub 250. Note that any high pressure gas that may form at location P in the figure, which will correspond to where a gun assembly would connect to the top sub, would be prevented from entering inside the top sub 250 by the second bulkhead element 270. Even if some of the high pressure gas manages to enter the bore 604 of the top sub 250, the first bulkhead element 260 is likely to prevent that gas to further advance toward the quick connect device 210. Thus, after the gun assembly is shot, there is no damage to the quick connect device 210 as the high pressure gas is stopped by the first and second bulkhead elements. In one application, only one bulkhead element is used for stopping the high pressure gas from the gun assembly. Also note that because the collar 360 is allowed to rotate relative to the mandrel 302, the quick connect device 210 can indeed be quickly attached to the top sub as no rotation of the top sub or the quick changcconnect device is necessary.

The springs inside the quick connect device are firmly connected to the corresponding electrical contacts, which gives the lowest possible electrical resistance to the electrical connections assembly 310. The springs and contacts are housed inside conductive tubes which further reduces the electrical resistance. These conductive tubes are placed inside insulating bushings 332, 334, 336, and 338 to isolate the thru connection from ground.

The quick connect device has been significantly shortened comparative to the existing tools, because it is designed to work with a particular mating hardware, rather than having to have extra room to accommodate a variety of mating hardware. In one application, the external surfaces of the quick connect device has the same o-rings simplifying field redressing. The o-ring surface on the downstream end of the mandrel 302 also acts as a guide, ensuring alignment when threading the collar 360 onto the mating hardware 250. The O-rings 362 that are sealed on the collar 360 lock the collar when downhole, reducing the possibility of it "backing off."

The port 621 present on the top sub 250 (or firing head) facilitates making the electrical connection to the guns through the line, which reduces the chances for a pinched wire and makes it easier to troubleshoot.

Having a pressure-sealing bulkhead 260 and/or 270 in the top sub 250 as shown in FIG. 8, seals the top gun and setting tool from moisture. They also protect the gun or setting tool in the case of a quick connect device, collar locator device, or firing head downhole flood event.

One or more of the embodiments discussed herein aim to protect the quick connect device from fire or pressure damage from a downhole tool. For this reason, it is intended that the top sub would take the brunt of the fire or pressure damage, as the bulkhead needs to be changed for other reasons. Thus, the combination of the top sub and the one or two bulkheads is preventing damaging conditions from the downhole tools to propagate to the quick connect tool 210.

Figure 9:
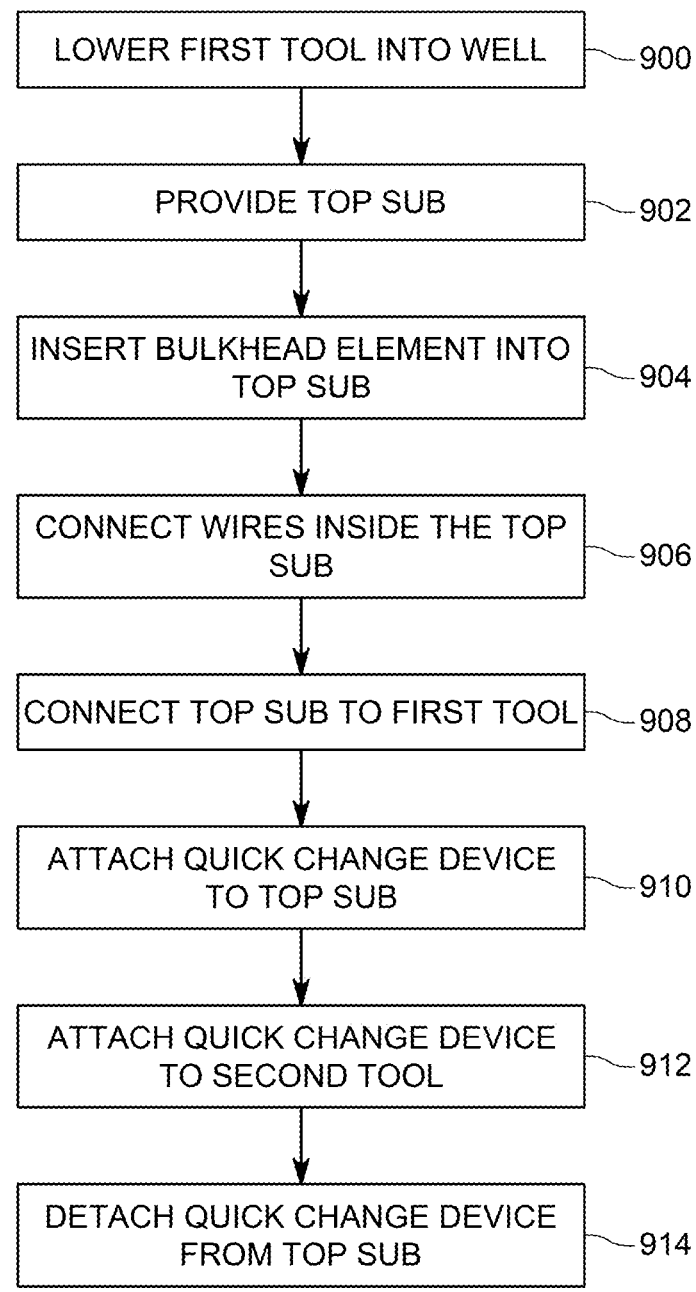
FIG. 9 is a flowchart of a method for using the quick connect system.

A method for quickly connecting a first downhole tool to a second downhole tool is now discussed with regard to FIG. 9. In step 900, the first downhole tool 240 (see FIG. 2) is provided. The downhole tool 240 may be a gun assembly, a setting tool, or a shoot-through bull plug. Then, in step 902, a top sub 250 is provided. The top sub 250 is configured to be attached with a downstream end to the first downhole tool 240 and with an upstream end to the quick connect device 210. In step 904, a first bulkhead element 270 is introduced into the upstream end or the downstream end of the top sub and it is fixed to the top sub with a nut 272. If necessary, a second bulkhead element 260 may also be added at the opposite end of the top sub in this step. The wires of these two bulkhead elements are then connected to each other in step 906. The connection is achieved manually, through the port 621. Then, the top sub 250 is mechanically connected in step 908 to the first downhole tool 240. Because the first and second bulkhead elements have spring-loaded contacts 706, manual electrical connections assembly between the top sub and the first downhole tool and the top sub and the quick connect device are not necessary.

In step 910, the quick connect device 210 is attached to the upstream end of the top sub. The spring-loaded contact 706 of the second bulkhead element 260 automatically engages with the spring-loaded contact 326 of the quick connect device 210 so that an electrical connection is achieved between these two elements. The mechanical connection between the top sub and the quick connect device is achieved by engaging the threads 352 of the quick connect device with the threads 630 of the top sub. Because the collar 360, which accommodates the threads 352 can rotate relative to the top sub, there is no need to rotate the entire first downhole tool when attaching the two elements to each other. For this reason, this connection is a quick connection.

Further, in step 912, the quick connect device is attached to the second downhole tool 220, which may be a wireline or a collar locator tool, or another tool. Then, the entire assembly is lowered into the well at the desired position and the gun assembly is fired. The electrical signals necessary to fire the gun assembly propagate through the quick connect device (specifically through the electrical connections assembly 310) and through the first and second bulkhead elements 270 and 260 of the top sub. Then, the entire assembly is brought to the surface until the connection between the quick connect device and the top sub is in reach. At that point, in step 914, the quick connect device is disconnected from the top sub and the current top sub may be replaced with another top sub as the first and second bulkhead elements have been damaged. In one application, only the first and second bulkhead elements are replaced. Note that there is no need to change the quick connect device at this time as its components have been protected from the high pressure gas generated by the gun assembly by the first and/or second bulkhead elements.

The method discussed above and the quick connect device and top sub combo are advantageous because the quick connect device is protected by consumable bulkhead elements, which are easy, quick and cheap to replace. Further, the quick connect device is shorter than the existing connecting tools. Furthermore, the electrical connection through the quick connect device is better than the existing electrical connections, moisture is prevented from entering the top perforating gun due to the presence of the bulkhead elements, and the port of the side of the top sub allows for connecting the through wire to the bulkhead with reduced risk of pinched wires.

The disclosed embodiments provide methods and systems for quickly attaching a first downhole tool to another downhole tool while protecting the components of a quick connect device that achieves this quick connection. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A quick connect system for connecting a first downhole tool to a second downhole tool, the quick connect system comprising:
a quick connect device configured to be mechanically attached to the first downhole tool; and
a top sub configured to be mechanically attached to the quick connect device and also to the second downhole tool,
wherein the top sub has a first bulkhead element that prevents a high pressure gas from the second downhole tool to damage the quick connect device, and
wherein the quick connect device has a spring-loaded electrical contact at each end.

2. The quick connect system of claim 1, wherein the quick connect device includes an electrical connections assembly that extends from one end to another end of the quick connect device.

3. The quick connect system of claim 2, wherein the electrical connections assembly includes:
a plunger;
a spring attached to the plunger; and
a barrel that houses the spring and the plunger.

4. The quick connect system of claim 3, wherein the electrical connections assembly further includes:
a fixed element fixedly attached to the barrel; and
a contact rod having a first end located inside the barrel.

5. The quick connect system of claim 4, wherein the electrical connections assembly further includes:
a screw fixedly attached to another end of the contact rod;
another spring configured to electrically contact the screw; and
an electrical contact configured to electrically contact the another spring.

6. The quick connect system of claim 5, wherein the plunger extends outside a body of the quick connect device and the electrical contact is located inside a chamber of the body.

7. The quick connect system of claim 6, wherein the plunger enters inside the first downhole tool and the electrical contact electrically contacts the first bulkhead element of the top sub.

8. The quick connect system of claim 7, wherein the first bulkhead element fully occupies a cross-section of a bore of the top sub and seals the quick connect device from the second downhole tool.

9. The quick connect system of claim 8, further comprising:
a second bulkhead element provided inside the top sub and facing the second downhole tool.

10. The quick connect system of claim 1, wherein the first downhole tool is a wireline and the second downhole tool is a gun assembly.

11. A quick connect device for connecting a first downhole tool to a second downhole tool in a well, the quick connect device comprising:
a mandrel extending along a longitudinal axis;
a collar attached to a downstream end of the mandrel;
an electrical connections assembly extending from one end to the other end of the mandrel; and
an electrical insulators assembly surrounding the electrical connections assembly to prevent an electrical contact between the electrical connections assembly and a body of the mandrel,
wherein both ends of the electrical connections assembly have spring-loaded electrical contacts.

12. The quick connect device of claim 11, wherein the electrical connections assembly comprises:
a plunger;
a spring attached to the plunger; and
a barrel that houses the spring and the plunger and extends along the longitudinal axis.

13. The quick connect device of claim 12, wherein the electrical connections assembly further includes:
a fixed element fixedly attached to the barrel; and
a contact rod having a first end located inside the barrel.

14. The quick connect device of claim 13, wherein the electrical connections assembly further includes:
a screw fixedly attached to another end of the contact rod;
a spring attached to the screw; and
an electrical contact attached to the spring.

15. The quick connect device of claim 14, wherein the electrical insulators assembly comprises:
a first tubular insulator located around the barrel;
a second tubular insulator located around the contact rod;
an insulator washer located adjacent the second tubular insulator; and
an insulator retainer that is adjacent to the insulator washer and also attached to the contact rod.

16. The quick connect device of claim 15, wherein the insulator retainer attaches with threads to the contact rod.

17. The quick connect device of claim 14, wherein there is a gap between the fixed element and the contact rod.

18. The quick connect device of claim 11, wherein the collar rotates relative to the body.

19. The quick connect device of claim 18, wherein the collar has a quick connection mechanism that connects to a sub without rotating the sub or the body.

20. A method for connecting a first downhole tool to a second downhole tool in a well, the method comprising:
providing the first downhole tool;
connecting a top sub to the first downhole tool;
attaching a quick connect device to the top sub; and
attaching the quick connect device to the second downhole tool,
wherein the quick connect device has a spring-loaded electrical contact at each end and the top sub includes at least one bulkhead element that prevents a high pressure gas from the first downhole tool to reach the quick connect device.

21. The method of claim 20, wherein the first downhole tool is a gun assembly and the second downhole tool is a wireline.

* * * * *